Figure 1:
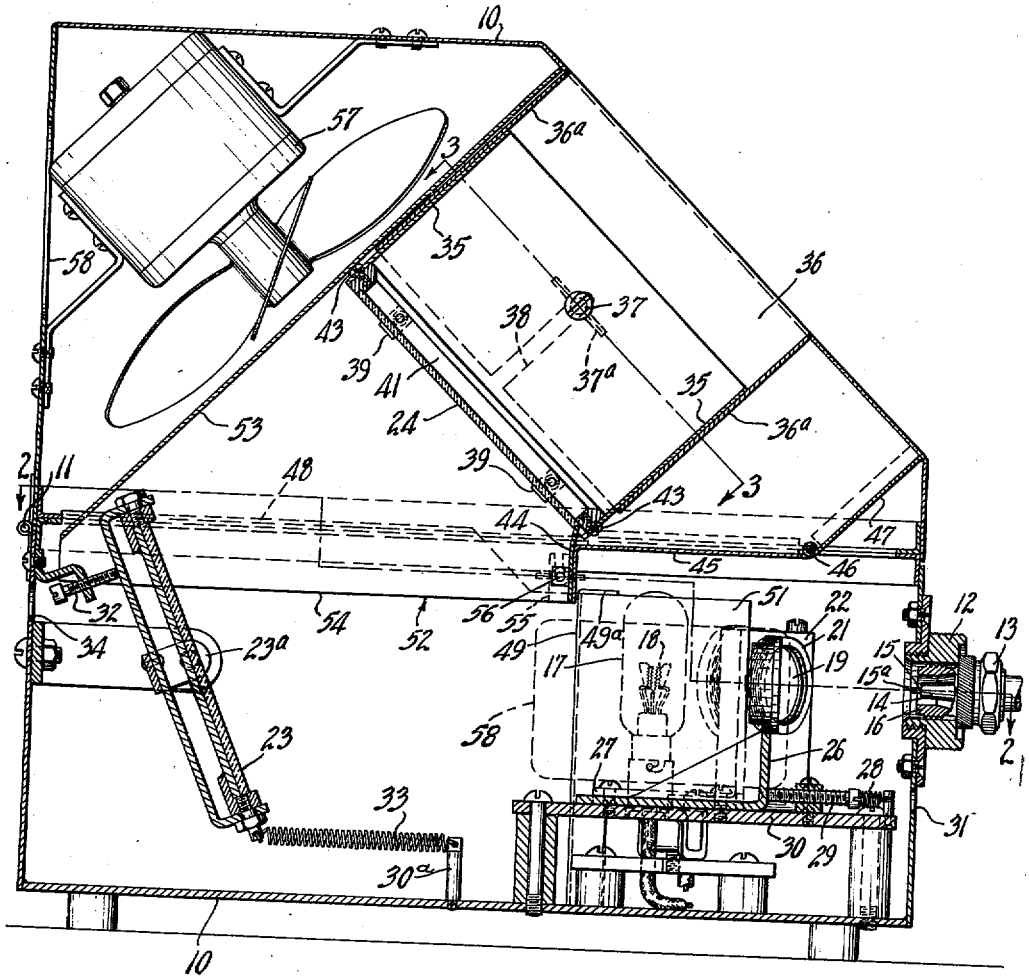

Nov. 12, 1940.  C. C. SOPER  2,221,154
APPARATUS FOR TESTING CONCENTRICITY OF SPARK PLUG PORCELAINS
Filed Sept. 24, 1938  2 Sheets-Sheet 2
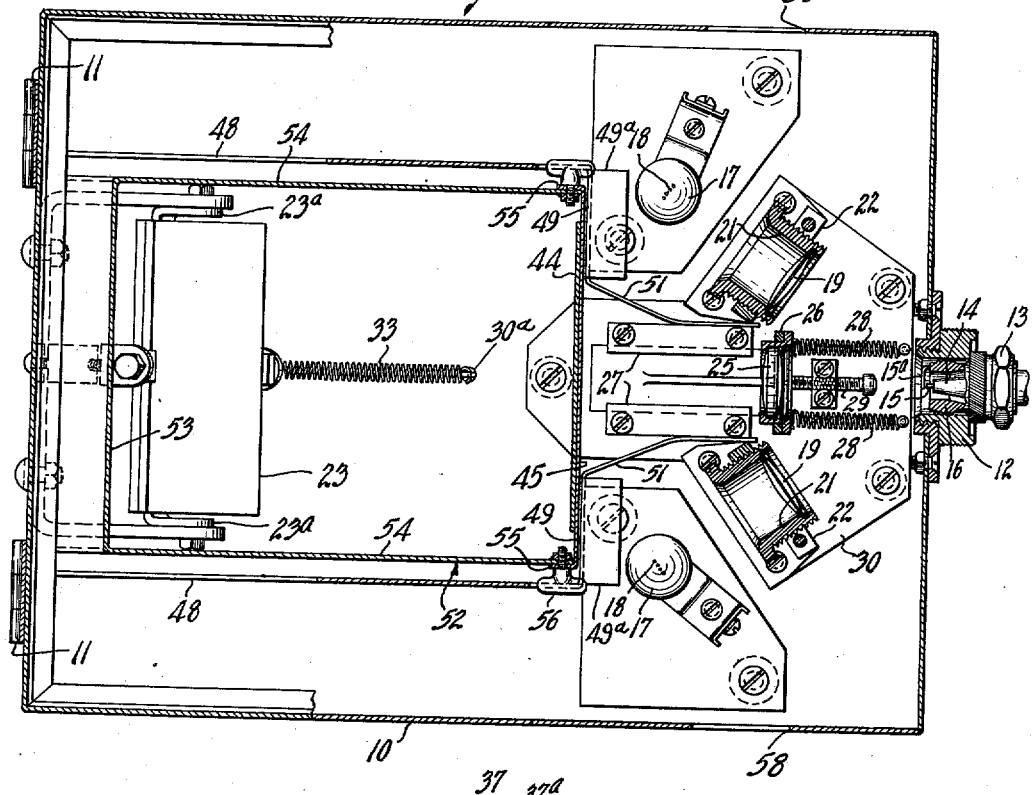
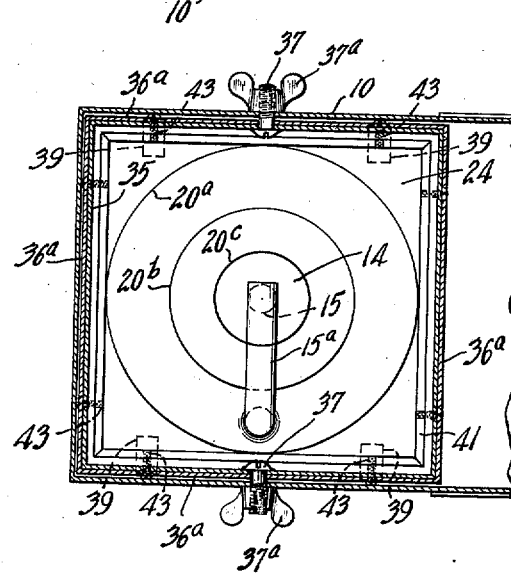
INVENTOR
CLEVELAND C. SOPER
BY
ATTORNEYS Patented Nov. 12, 1940

2,221,154

UNITED STATES PATENT OFFICE 2,221,154

APPARATUS FOR TESTING CONCENTRICITY OF SPARK PLUG PORCELAINS

Cleveland C. Soper, Kent, Ohio, assignor to The Firestone Tire & Rubber Company, Akron, Ohio, a corporation of Ohio Application September 24, 1938, Serial No. 231,551

5 Claims. (Cl. 88—14)

This invention relates to concentricity testing, more especially to apparatus for testing the concentricity of porcelains in an assembled spark plug.

Often, when spark plugs are assembled, the porcelain insulating the center electrode from the metal shell of the spark plug is not of the exact shape desired. This results in the porcelain positioning the center electrode eccentrically in the metal shell and when this condition exists, the insulating quality of the porcelain is reduced. Also, mounting the porcelain eccentrically frequently acts to strain portions of the porcelain so that they are easily cracked and their effective life shortened.

The main object of this invention is to provide apparatus for rapidly and inexpensively testing the concentricity of porcelains in spark plugs.

Other objects of the invention are to provide accurate, easily operated and adjustable apparatus for testing varying-sized spark plugs.

The foregoing and other objects will be manifest from the following specification.

The present invention, broadly speaking, comprises mounting an electric light bulb in a closed chamber and inserting the base of an assembled spark plug into the chamber so that light from the electric bulb is directed upon the lower end thereof. Then, the image of the base of the spark plug is directed onto suitable reflecting means which project the image onto a translucent plate. This plate is provided with centering lines thereon which are designed to coincide with the image of the spark plug when the porcelain of the tested spark plug is concentrically positioned therein. The translucent plate and light directing and reflecting means are all adjustably positioned so that varying sized spark plugs can be tested, the apparatus being set by inserting an assembled spark plug having a concentrically positioned porcelain in the apparatus and bringing its image into register with the lines on the centering plate.

The invention is described with reference to the accompanying drawings, of which;

Figure 1 is a vertical section of apparatus embodying the invention; and

Figures 2 and 3 are sections taken on lines 2—2 and 3—3, respectively, of Figure 1.

A rectangular box, or chamber 10 is shown in Figure 1 enclosing the apparatus of the invention. This box is hinged at 11 in order to give ready access to its interior. A seat, or socket 12, for the base of a spark plug is detachably secured in one wall of the box 10 so that it can be changed with the varying sized spark plugs tested. A spark plug 13 having a porcelain 14, center electrode 15, ground electrode 15a, and metal shell 16 is shown carried by socket 12.

In order to illuminate the base of the spark plug on the socket 12, two electric light bulbs 17 are mounted in the chamber 10. These bulbs are provided with substantially point-size filaments 18 which are in a horizontal plane with the center of spark plug 13, thus facilitating illuminating the bottom of the spark plug. Figure 2 shows that the bulbs 17 are spaced a slight distance from the axis of the spark plug 13, as well as being positioned an appreciable distance from the spark plug. Focusing lenses 19 may be mounted between the bulbs 17 and the mounted spark plug in order to concentrate light upon the end of the porcelain 14. These lenses 19 are carried in tubular seats 21 which engage with threaded brackets 22 so that the position of the lenses 19 relative to the spark plug 13 can be varied.

A mirror 23 is provided to reflect an image of the base of the mounted spark plug upon a downwardly slanted translucent plate 24 which has centering lines, such as concentric circles 20a, 20b, and 20c, formed thereon. The images of the porcelain and shell of the spark plug coincide with the centering circles 20a, 20b, and 20c when the porcelain 14 is concentric relative to the metal shell 16. In some instances, a centering, or standardization line (circle 20c) for the porcelain 14 is the only centering means required. An enlarging lens 25, which is carried by bracket 26 that is slidably received between bars 27, which are secured to a platform 30 on the base of the box 10, preferably is positioned between the mirror 23 and the spark plug 13. Springs 28 are secured to the bracket 26 to urge the bracket towards the spark plug 13 while a screw 29 bears upon the plate 26 to limit its movement towards the spark plug. Thus, means are provided to vary the position of the enlarging lens 25 in order that the image can be properly focused on the plate 24. A hole 31 is formed in the wall of the chamber 10 so that means can be inserted into the box to vary the position of the screw 29 and thereby that of the lens 25. The mirror 23 is mounted for pivotal vertical movement within the box 10 by hinges 23a and its position is controlled by a screw 32 on which the mirror bears due to a spring 33 that is secured between the lower edge of the mirror and a pin 30a on the box 10. Hole 34 in the box 10 permits adjustment of the screw 32.

Preferably the position of the translucent plate 24, usually made from glass, relative to the mirror 23 is variable. Thus, the plate is carried by a box-like member 35 that is slidably received in a rearwardly and downwardly extending open-topped compartment 36 determined by the partitions 36a in the box 10. Screws 37, carried on the member 35, extend through slots 38 in the box 10 and carry wing nuts 37a so that the member 35 can be moved along the axis of the compartment 36 and be held in adjusted position by tightening the wing nuts 37a against the outer walls of the box.

Lugs 39 on opposite sides of a frame 41 which is secured in the member 35 by screws 43 engage the lower surface of the sides of the plate 24 to form a support therefor. The frame 41 engages the upper edge of the plate while the lower edge thereof bears upon a substantially vertically extending stop plate 44 which is carried by a cover member 45. The cover member 45 is hinged at 46 to a downwardly and rearwardly extending plate 47 associated with the upper portion of the front of the box 10, the cover member being retained in position by means hereinafter described.

Sometimes it is most convenient to change the glass plate when adapting the testing apparatus for a different sized spark plug. Thus the upper portion of the box 10 may be raised whereby the cover member 45 and stop plate 44 are accessible and may be swung downwardly whereby the plate 24 can be slid from the frame 41 and a plate having the desired diameter centering lines be substituted therefor.

Obviously it is necessary that light from the bulbs 17 should not directly reach the plate 24. For this reason vertically extending partitions 48 are carried on the base of the box 10. Each partition extends forwardly from the rear of the box to a point adjacent one of the bulbs 17, decreasing in height adjacent the bulbs. Then the partitions are bent inwardly at right angles to form side members 49 which terminate in forwardly and inwardly directed wings 51. The wings 51 (Figure 2) extend to points between adjacent bulbs 17 and lens 25. The upper portions 49a of the side members 49 should be bent over forwardly to provide room for the cover member 45 and stop plate 44 as they are moved into normal position by rotating the upper portion of the box downwardly and also to prevent passage of light rays directly to the plate 24.

To aid in shielding the plate 24, a cover 52, substantially U-shaped in section, is secured to the downwardly inclined portion of the upper half of the box 10. The cover 52 extends downwardly and rearwardly and fits snugly around the rear and sides of the partitions 36a forming the compartment 36. Figure 1 illustrates that the rear portion 53 and the sides 54 of the cover 52 extend down sufficiently to overlap the partitions 48 and prevent passage of light to the plate 24 by an undesired route. The cover 52 engages with stop plate 44 through slotted ears 55 formed on the cover member 45. Screws 56, engaged with the cover 52, bear upon the ears 55 to retain the stop plate in position while it is freed for downward movement by loosening the screws 56.

A fan 57 is mounted within the box 10 to circulate air therethrough since the bulbs 17 generate appreciable heat within the box. Apertures 58, which may be screened, are provided in several portions of the box 10 to facilitate air circulation.

In operation, it is seen that a spark plug is positioned upon the socket 12 and light from the bulbs 17 focused upon the bottom of the mounted spark plug. An image of the end of the spark plug is projected upon the mirror 23 by the lens 25, the mirror reflecting the image onto the translucent plate 24. Then the operator of the apparatus has a direct view of the plate 24 through the compartment 36 whereby he can directly and rapidly compare the projected image with the theoretical, or desired, image formed upon the translucent plate 24.

From the foregoing description, it will be observed that a rapid, inexpensive and positive concentricity testing apparatus for assembled spark plugs has been provided.

In accordance with the patent statutes, I have described the construction and operation of an embodiment of the invention. However, it will be understood that various modifications can be made without departing from the scope of the invention as defined in the appended claims.

What is claimed is:

1. Apparatus for testing the concentricity of assembled spark plugs having porcelains visible from the lower end thereof, said apparatus comprising a closed chamber, two light bulbs mounted in said chamber, a socket for mounting the lower end of a spark plug secured in a wall of said chamber to expose the lower portion of the spark plug to the interior of said chamber, a lens adjustably positioned in said chamber between said socket and each of said light bulbs for focusing light therefrom onto the base of a mounted spark plug, a mirror positioned in said chamber on the axis of said socket to catch and reflect the image of the base of a mounted spark plug, a lens adjustably positioned in said chamber between said socket and said mirror for enlarging the image of the base of a mounted spark plug and directing it onto said mirror, a translucent plate having standardization lines thereon adjustably mounted in a wall of said chamber on the forward side of said mirror to receive an image therefrom, and means for controlling the position of said mirror relative to said plate and said socket whereby the position of the image reflected onto said plate can be controlled and be compared with said standardization lines.

2. Apparatus for testing the concentricity of assembled spark plugs having porcelains visible from the lower end thereof, said apparatus comprising a closed chamber, a light bulb mounted in said chamber, a socket for mounting the lower end of a spark plug secured in a wall of said chamber to expose the lower portion of the spark plug to the interior of said chamber, a lens adjustably positioned in said chamber between said socket and said light bulb for focusing light therefrom onto the base of a mounted spark plug, a mirror positioned in said chamber, a lens adjustably positioned in said chamber between said socket and said mirror for directing the image of the base of a mounted spark plug onto said mirror, a translucent plate having standardization lines thereon mounted in said chamber on the forward side of said mirror to receive an image therefrom, and means for controlling the position of said mirror relative to said plate and said socket whereby the position of the image reflected onto said plate can be controlled and be compared with said standardization lines.

3. Apparatus for testing the concentricity of assembled spark plugs having porcelains visible from the lower end thereof, said apparatus comprising a closed chamber, illuminating means mounted in said chamber, a socket for mounting the lower end of a spark plug secured in a wall of said chamber to expose the lower portion of a mounted spark plug to the interior of said chamber, a lens positioned in said chamber between said socket and said illuminating means for focusing light therefrom onto the base of a mounted spark plug, a mirror positioned in said chamber on the axis of said socket to catch and reflect the image of the base of a mounted spark plug, and a translucent plate having standardization lines thereon mounted in a wall of said chamber on the forward side of said mirror to receive an image therefrom whereby the position of the image reflected onto said plate can be compared with said standardization lines.

4. Apparatus for testing the concentricity of assembled spark plugs having porcelains visible from the lower end thereof, said apparatus comprising a closed chamber, a socket for mounting the lower end of a spark plug secured in a wall of said chamber to expose the lower portion of a mounted spark plug to the interior of said chamber, means in said chamber for illuminating the base of a mounted spark plug, a mirror positioned in said chamber to catch and reflect the image of the base of a mounted spark plug, and a translucent plate having standardization lines thereon mounted in a wall of said chamber on the forward side of said mirror to receive an image therefrom whereby the position of the reflected image can be compared with said standardization lines.

5. Apparatus for testing the concentricity of an assembled spark plug having an electrode, a porcelain and a shell visible from the lower end thereof, said apparatus comprising a closed chamber, means for mounting the lower end of a spark plug associated with a wall of said chamber to expose the lower portion of a mounted spark plug to the interior of said chamber, illuminating means in said chamber adjacent said mounting means but in spaced relation to the axis thereof for illuminating the base of a mounted spark plug, image transmitting means positioned in said chamber, and a translucent plate adapted to receive the image of the base of a mounted spark plug, said translucent plate having a plurality of concentric circles formed thereon with which the image of the electrode, porcelain and shell coincides when the porcelain of the mounted spark plug is concentrically positioned in the metal shell.

CLEVELAND C. SOPER.